H. J. BRYANT.
SPRING FASTENER.
APPLICATION FILED FEB. 1, 1921.
1,431,929. Patented Oct. 17, 1922.
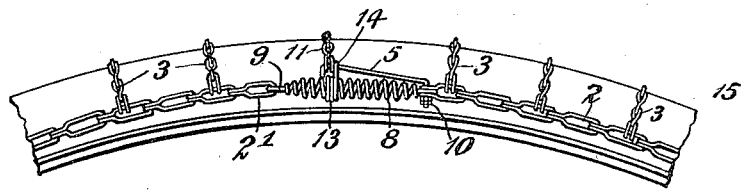
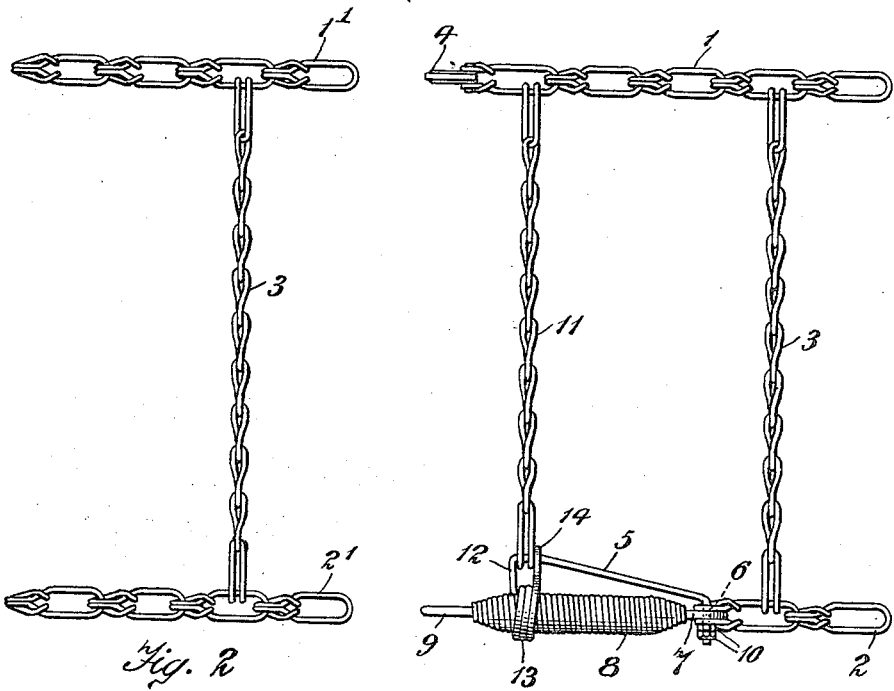
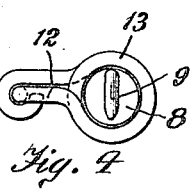
Inventor
Herbert J. Bryant
By his Attorneys
Townsend & Decker Patented Oct. 17, 1922.

1,431,929

UNITED STATES PATENT OFFICE.

HERBERT J. BRYANT, OF NEW YORK, N. Y.

SPRING FASTENER.

Application filed February 1, 1921. Serial No. 441,533.

*To all whom it may concern:*

Be it known that I, HERBERT J. BRYANT, a citizen of the United States, and a resident of New York, in the county of New York and State of New York, have invented certain new and useful Improvements in Spring Fasteners, of which the following is a specification.

My invention has for its object the production of a simple, inexpensive and compact fastener adapted to hold the ends of a linear member, such as a chain, together.

The invention is particularly adapted for use in conjunction with an anti-skid tire chain such as the well known Weed chain and acts not only to firmly hold the chain in proper position on the tire but acts as well as a constant take-up therefor. It also permits the chain to slacken when necessity arises.

The invention consists in the novel parts and combinations hereinafter more particularly described and then specified in the claims.

In the accompanying drawing showing a practical embodiment of the invention as applied to a non-skid chain:

Fig. 1 is a fragmentary side elevation of an anti-skid chain with my improved fastener applied thereto.

Fig. 2 is an enlarged plan view of the chain with the ends of the longitudinal members thereof detached from each other.

Fig. 3 is a side elevation (partly in section) of a portion of the device.

Fig. 4 is an end view of the fastener.

Referring in detail to the drawing:

1 and 2 indicate the longitudinal, parallel chain members of an anti-skid chain, the rear ends thereof being indicated at 1' and 2' respectively. 3 indicates the transverse chain members of the anti-skid chain which connect the longitudinal members 1 and 2 at spaced intervals throughout their length. The end links of said transverse members 3 are permanently linked to similar links in the longitudinal members 1 and 2 directly opposite to each other whereby the members 3 are at right angles to the members 1 and 2. The longitudinal chain member 1 is provided at its forward end with any suitable form of clasp or catch 4 adapted to be removably fastened or interlocked with the terminating link of the rear end 1' of the chain member 1.

5 indicates the inclined rod or wire of the fastener having a rear end 6 bent outwardly as shown and adapted to extend through the terminating link of the chain member 2 at its forward end as well as through an eye 7 carried by an elongated coil spring 8 which carries a hook 9 at the forward end thereof. The rear end 6 of the inclined rod 5 thus provides a pivoted connection for the coil spring 8 and the chain member 2, and as the end 6 is screw-threaded this pivoted connection may be removably maintained by means of the nuts 10 on said screw-threaded end 6. The forward end of said rod 5 is adapted to pass loosely through the end link of the first transverse chain member which is indicated at 11. Said rod 5 is bent or turned outwardly as indicated at 12 and then coiled or convolved one or more times, as at 13, which coils form a bearing receiving and loosely supporting the forward end of the elongated spring 8, which extends longitudinally therethrough. The extreme forward end of said rod terminates in an inwardly extending hook 14 pressed against and tightly engaging said rod and acting to strengthen and support the rod and, when the device is used on an anti-skid chain, as a stop to prevent the transverse chain member 11 from slipping downwardly thereon.

As will be understood, the length of the member 1 is substantially equal to that of the member 2 plus the length of the coil spring 8, these lengths being approximately equal to the length of the periphery of the rim of the wheel to which the tire 15 is applied. In assembling the anti-skid chain with my device upon a tire, it is drawn circumferentially around the tire with the longitudinal chain members at opposite sides thereof. The clasp or catch 4 is then fastened to a link at the rear end 1' of the member 1 and the hook 9 is hooked to a link at the rear end 2' of the member 2. The hooking of the hook 9 in the manner described draws the spring 8 outwardly, through the bearing 13 as indicated in Fig. 1, under tension and has the effect of taking up the slack on the opposite side of the anti-skid chain and drawing and holding the several elements thereof in close engagement with the tire with the chain members 3 and 11 extending transversely around the periphery of the tire and equidistant from each other and the chain members 1 and 2 extending circumferentially around the sides of the tire adjacent the rim of the wheel.

By means of my invention any slack in the anti-skid chain is at all times automatically taken up whereby it will constantly hug the tire and any objectionable rattling thereof will be obviated. I am thus enabled to secure the desired close engagement of the chain with the tire without the instrumentality of separate fastening elements for taking up the slack in the chain members which are in common use but which are objectionable as they are cumbersome, impractical and very often themselves rattle. Moreover, they distort the shape of the anti-skid chain or several of the elements thereof and provide projections or protuberances which bite into the tire and shorten the life thereof. By means of my invention, moreover, if any of the elements of the anti-skid chain strikes a hard projection on the road or at the side thereof, such as the curb, which does not "give" the spring 8 will be drawn outwardly through its bearing to allow a certain amount of slack in the chain until the projection has been passed, whereupon the slack in the tread will be immediately taken up by the action of said spring. This obviates damage to or breakage of the chain members which now very often obtains under similar conditions.

What I claim as my invention is:—

1. In a spring fastener, a spring having a hook on one end and an eye on the other end, a rod having an end extending through said eye and a bearing receiving and supporting said spring and integral with said rod.

2. In a spring fastener, a spring provided with fastening means on one end, a rod to which the other end of said spring is pivoted and a bearing integral with said rod end supporting said spring and through which said spring extends.

3. In a spring fastener, a spring provided with fastening means on one end and with an eye on the other end and a rod having an end extending through said eye, a portion of said rod being convolved and loosely receiving said spring therein and forming a bearing for said spring and the other end of said rod being provided with a hook engaging said rod.

4. In a spring fastener, a spring provided with fastening means on one end and a rod to which the other end of said spring is pivoted, said rod being bent outwardly and convolved and then bent inwardly to bring the end of said rod into engagement with the main or body portion thereof, said convolved portion receiving said spring and acting as a bearing therefor.

Signed at New York, in the county of New York and State of New York, this 31st day of January, A. D. 1921.

HERBERT J. BRYANT.

Witnesses:
F. G. TOWNSEND,
GEORGE E. BROWN.